T. B. FREAS.
CONSTANT TEMPERATURE BATH.
APPLICATION FILED MAR. 22, 1911.
1,024,565.
Patented Apr. 30, 1912.
5 SHEETS—SHEET 2.
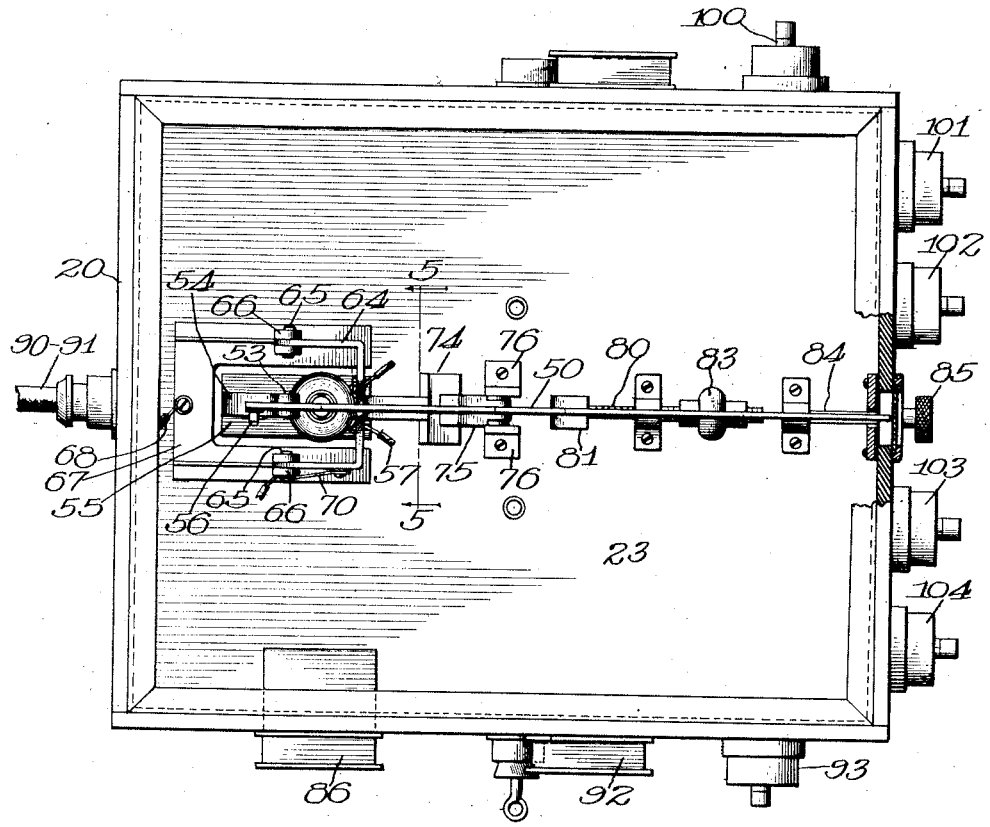
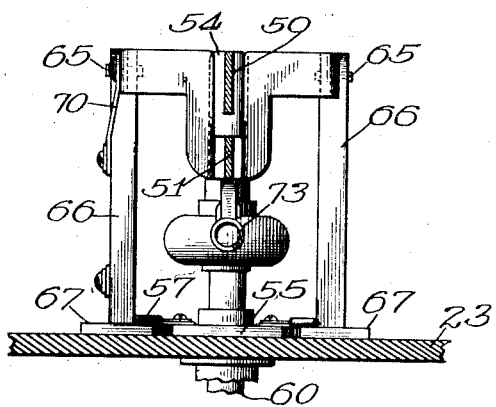
Witnesses:
G. L. Dumarus Jr.
U. F. Kilroy
Inventor:
Thomas B. Freas
By: Cheever & Cox
Attys:

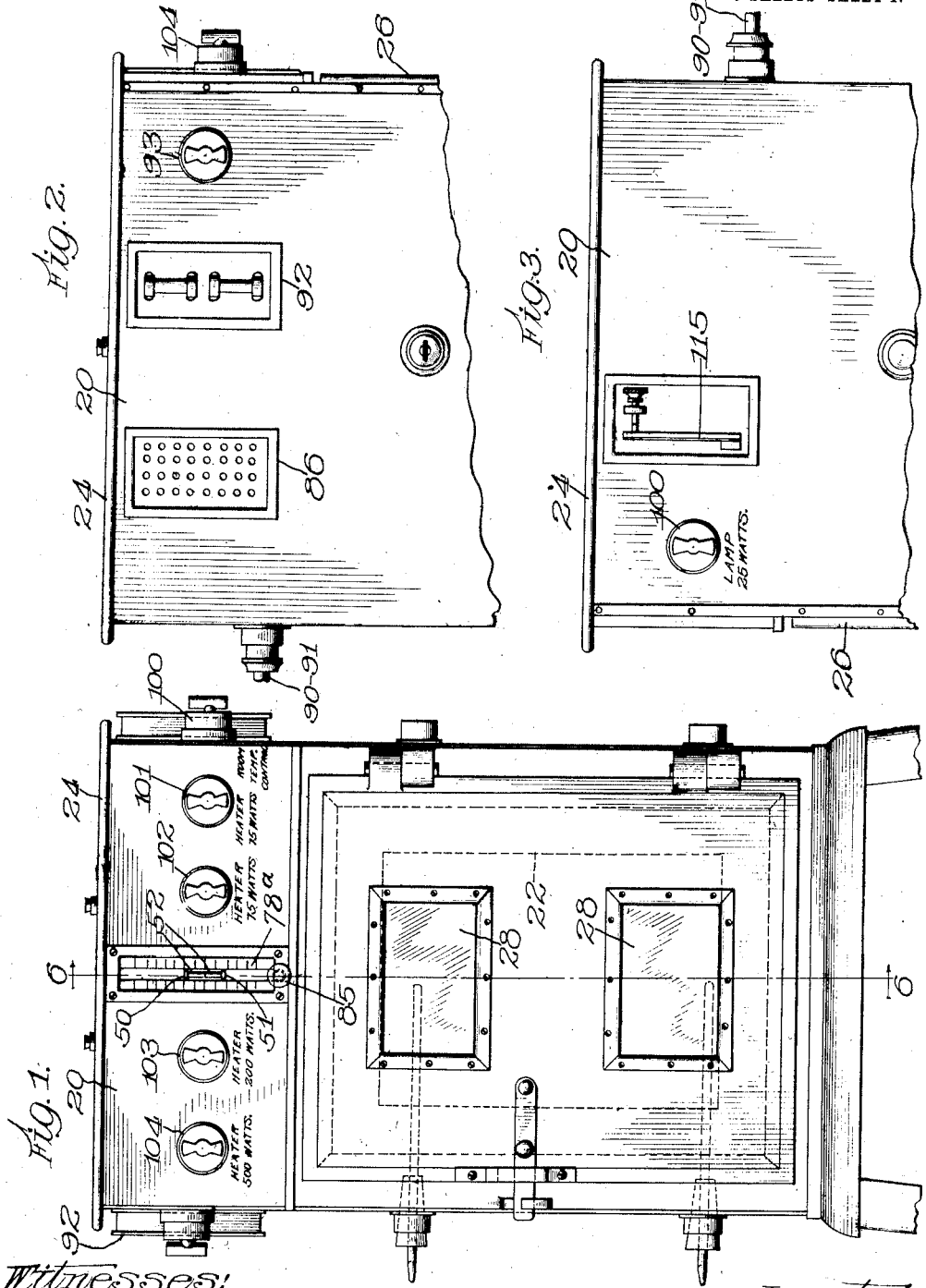
T. B. FREAS.
CONSTANT TEMPERATURE BATH.
APPLICATION FILED MAR. 22, 1911.
1,024,565.
Patented Apr. 30, 1912.
5 SHEETS—SHEET 1.

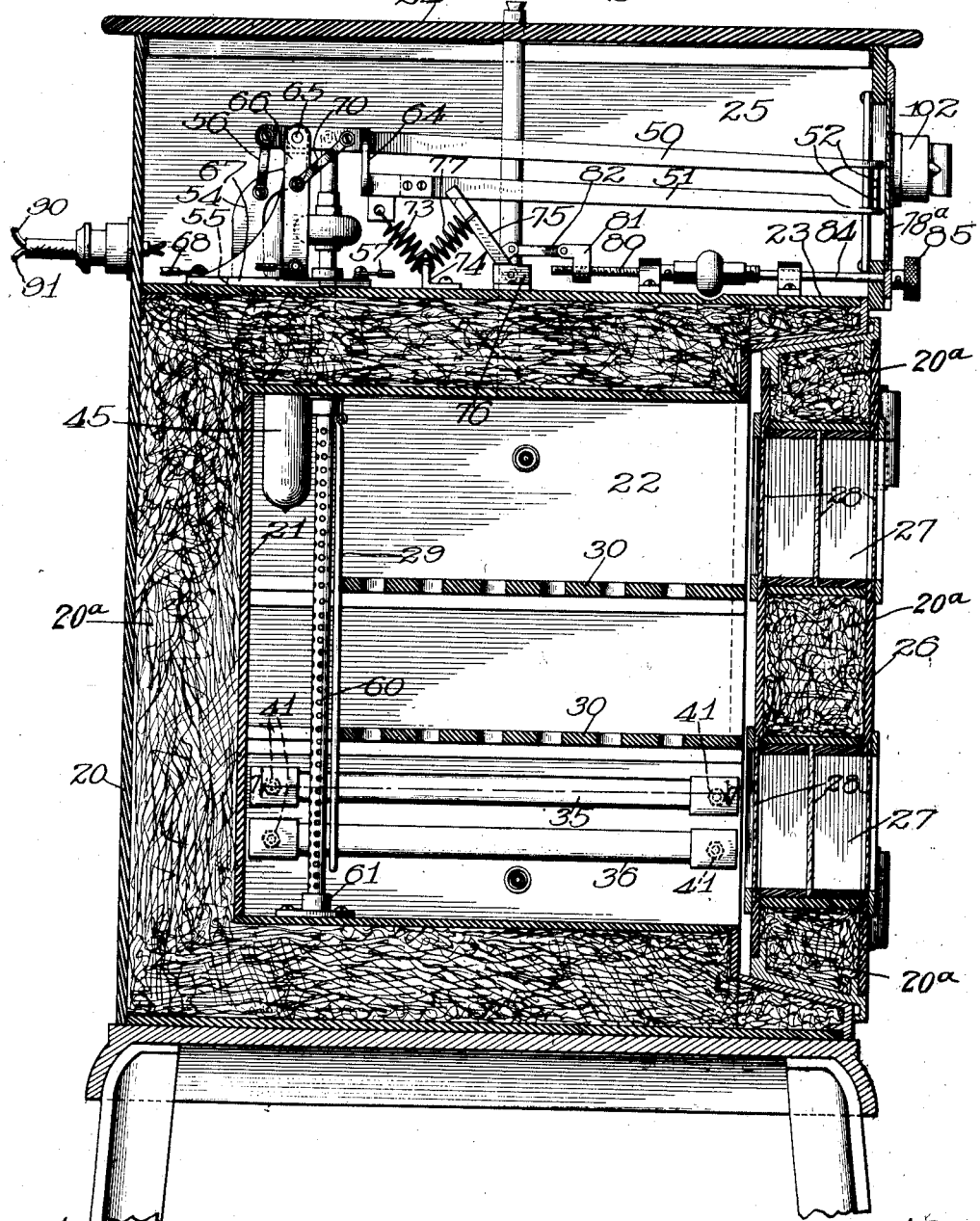

T. B. FREAS.
CONSTANT TEMPERATURE BATH.
APPLICATION FILED MAR. 22, 1911.
1,024,565.
Patented Apr. 30, 1912.
5 SHEETS—SHEET 4.
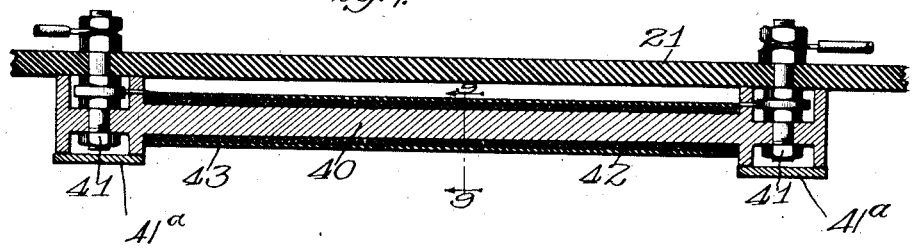
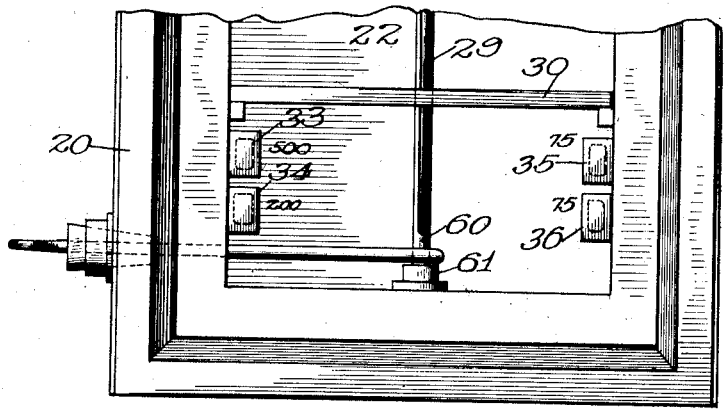
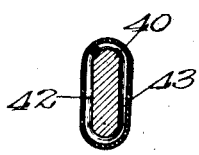
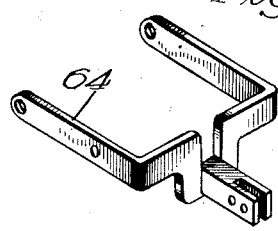
Witnesses:
G. A. Domarus Jr.
W. P. Kilroy
Inventor:
Thomas B. Freas
By: Cheever & Cox
Attys.

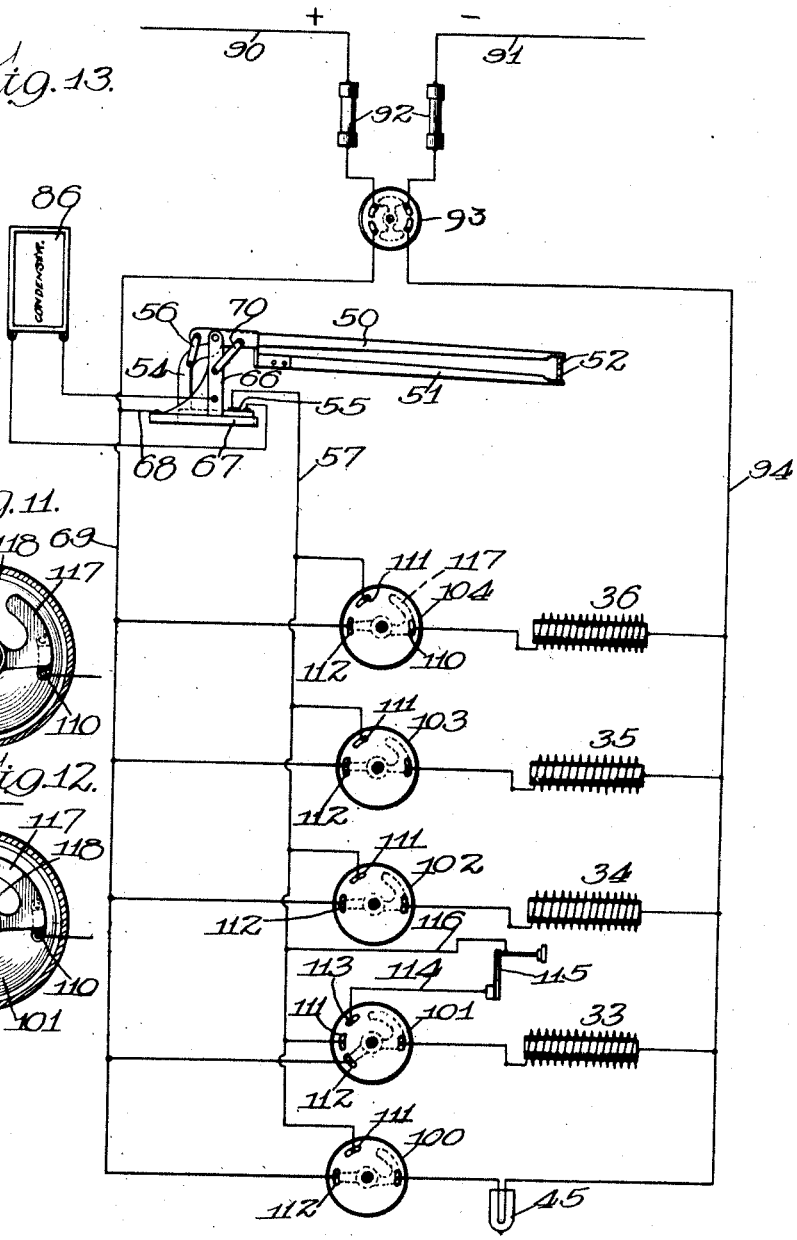

UNITED STATES PATENT OFFICE.

THOMAS B. FREAS, OF CHICAGO, ILLINOIS, ASSIGNOR TO V. WEBER & COMPANY, OF CHICAGO, ILLINOIS, A CORPORATION OF ILLINOIS.

CONSTANT-TEMPERATURE BATH.

1,024,565.   Specification of Letters Patent.   Patented Apr. 30, 1912.

Application filed March 22, 1911. Serial No. 616,207.

*To all whom it may concern:*

Be it known that I, THOMAS B. FREAS, a citizen of the United States, residing at Chicago, in the county of Cook and State of Illinois, have invented a certain new and useful Improvement in Constant-Temperature Baths, of which the following is a specification.

My invention relates to constant temperature baths, and the object of the invention is to provide means for maintaining the temperature accurately at any desired degree of heat irrespective of the changes of room temperature.

Ancillary to the general object of the invention it is my purpose to provide various advantageous structural details hereinafter more particularly described and claimed.

I obtain my objects by the mechanism illustrated in the accompanying drawings, in which—

Figure 1 is a front elevation of the complete apparatus. Figs. 2 and 3 are elevations of the upper portions of the apparatus looking respectively toward the left and toward the right of Fig. 1. Fig. 4 is a plan of the apparatus with the top cover removed. Fig. 5 is an elevation of part of the mechanism, the view being taken on the line 5—5, Fig. 4. Fig. 6 is a sectional elevation of the complete apparatus taken on the line 6—6, Fig. 1. Fig. 7 is a plan section showing one of the heaters and the adjacent parts which support it. The view is taken on the line 7—7, Fig. 6. Fig. 8 is a front elevation of the lower portion of the apparatus with the front door removed. Fig. 9 is a transverse section through one of the heaters, the view being taken on the line 9—9, Fig. 7. Fig. 10 is a perspective view of the hanger which supports the lower contact arm. Figs. 11 and 12 are detail views showing two of the switches employed. Fig. 13 is a wiring diagram showing the electrical connections.

Similar reference characters denote like parts throughout the several views.

In the form selected to illustrate the invention the casing consists of an outer box 20 and an inner box 21, the latter forming the receiving chamber 22 wherein the contents are to be placed. The outer walls and inner walls, as well as the shelving, are preferably asbestos, covered with a white porcelain enamel. The asbestos employed for the walls and shelving is that which is known to the trade as asbestos wood or "transite." This is made of asbestos fiber and a cement and is like a hard wood, being capable of taking a good polish. Within the casing near the upper part thereof is a floor 23, between which and the top cover 24 is formed a chamber 25 which contains part of the regulating mechanism, hereinafter described. Asbestos, mineral wool, or other suitable insulating material 20ª is preferably placed between the inner and outer walls 20 and 21 for preventing radiation of heat. At the front of the casing is a door 26 which is preferably tapered at its edges to fit a correspondingly tapered opening in the front of the casing, as shown. The door is provided with peripheral flanges overlapping the edges of the door opening, and it will be noted that there is no metal leading from the interior to the exterior. Hence the apparatus is comparatively free from heat leaks, which fact is very important for accurate regulation and for economy of heat. Peep holes 27 are formed in door 26 to enable the operator to note conditions within the receiving chamber. In the present design these peep holes are protected by three layers 28 of glass, isinglass or other material suitable for the purpose. A thermometer 29 is hung in convenient position within the chamber where the operator looking through the peep holes may note the temperature. Within the chamber 22 are shelves 30 for supporting the articles or substances being treated. Within the receiving chamber, preferably below the lower shelf, are electric heaters 33, 34, 35, 36. In the design illustrated these are constructed and supported as shown in detail in Figs. 7 and 9. A core 40 of asbestos is supported upon studs 41 penetrating one of the inner walls of the casing. Around these cores are wrapped coils of resistance wire which cause heating when current passes through them. The wires are connected to the studs 41 and thence to the conductors leading from the source of electrical supply. The coils are inclosed within sheaths 43. Studs 41 are preferably covered by asbestos board 41ª (see Fig. 7.) In addition to the heaters 33, 34, 35 and 36 is a lamp 45 which when turned on serves to both light the interior of the apparatus and contribute to the heating thereof.

I will now describe the regulating devices by which the temperature of the bath is controlled: In chamber 25 at the upper portion of the apparatus are two regulator arms 50 and 51. In the present arrangement the non-moving arm 51 is located directly beneath the moving arm 50, and each of them carry at their outer extremities contact points 52 adapted to move toward and from each other for making and breaking the circuit to the heating devices. The moving arm 50 is fulcrumed upon the pin 53 supported in the standard 54 rising from the base plate 55, as best shown in Figs. 4, 5 and 6. The arm 50 is electrically connected to the standard by means of the flexible conductor 56, and the base plate is electrically connected to the conductor 57. Arm 50 is rotated about its fulcrum to open and close the circuit by a tube 60 which passes through the chamber 22 and bears at its foot upon the casting 61 on the floor of the chamber. Tube 60 consists of thin perforated brass tubing or other substance adapted to expand and contract in response to variations in temperature. Said tube is articulately connected to arm 50 in such manner that when it expands under the action of heat it will tend to raise arm 50 out of contact with the arm 51.

The inside of the bath is almost entirely free from exposed metal (except the tube 60, intended for regulation.) As the inner walls and shelves are asbestos covered with a white porcelain enamel, the bath is not attacked by fumes and the interior may be kept clean and sanitary. Arm 51 is rigidly connected to a hanger 64, shown in perspective in Fig. 10. This hanger is bifurcated and is fulcrumed on the pins 65 supported in the standards 66 rising from the base plate 67. Said base plate is electrically connected by the conductor 68 to the line conductor 69. The standards 66 are electrically connected to the hanger 64 by the flexible conductor 70. A spring 73 connected at one end to the hanger and at the other end to a lug 74 on the floor 23 tends to hold arm 51 down as far as it will go. The downward movement of the arm is limited by a stop 75 pivoted at its lower end to blocks 76 rigidly secured to floor 23, as best shown in Figs. 4 and 6. Said stop is notched at its upper end to receive the under edge of the arm 51. A spring 77 is attached at one end to stop 75 and at the other end to lug 74 and tends to draw said stop downward. The position of the stop is adjusted by means of tension mechanism comprising in the present instance a screw 80 screwing in a block 81 connected by a link 82 to said stop. Said screw is connected by an insulating joint in the form of a turn buckle 83 to a rod 84 provided with a knurled head 85 located on the outside of the apparatus within reach of the operator. By reference to the drawings it will be seen that when the operator screws up the head 85 he will draw the stop 75 to a more nearly upright position against the tension of spring 77 and thus raise the arm 51 to a higher position.

The movement of the free arm 50 due to changes of temperature in the bath is caused by the difference in coefficient of expansion of the tube 60 and the asbestos walls of the bath. For the purposes here the walls of the bath may be considered to have a coefficient of expansion *nil*. It can readily be seen that if these walls were made of a material whose coefficient of expansion was equal to that of the tube 60 any change of temperature in the bath would move both pivots of the whole bar of which arm 50 is a part, and there would be no relative movement of arm 50 with respect to arm 51. But if the pivot 53 does not move with changes in the temperature of its support which in finality is the walls of the box, and the pivot on the upper end of the tube 60 moves up and down according to changes in temperature of tube 60, then small movements of the end of tube 60 due to changes in the temperature of the bath will be multiplied by the ratio of the two parts of the bar 50 considered at the contact points 52. This method of depending upon the walls is of great importance, and as indicated above could not be used by baths as they are ordinarily constructed of metal. The wall construction assists immensely in securing a regulation which has long been the goal of thermostat makers.

The arms 50 and 51 rotate about a common center in the sense that the axes of their pivots 53 and 65 are in the same straight line. This is important as it insures that the contacts 52 will always meet squarely regardless of their position relatively to the scale 78$^a$. By bifurcating the hanger 64 in the manner shown, the parts thereof at the fulcrum point are remote from the arm 50 and hence the danger of short circuits is minimized.

The graduated scale 78$^a$ shown in Figs. 1 and 6 adjacent to contact points 52 may be an arbitrary scale or it may be a scale calibrated in degrees of centigrade or Fahrenheit or any other standard. Thus by having a scale properly calibrated with reference to the division line between the contacts 52 one may by turning knurled knob 85 set the temperature of the bath at any desired predetermined temperature. This is a very important point as a thermostat in which this predetermined setting could be accomplished is believed to be new and is certainly a very desirable feature. A condenser 86 is electrically connected to the arms 50 and 51 to prevent sparking at the contacts 52. (See Fig. 13.)

Now referring more particularly to the diagram, Fig. 13, the operating current is supplied from the mains 90 and 91 which are provided with fuses 92 and lead to the main switch 93. One terminal of the switch is connected to the conductor 69 above mentioned and the other terminal to the conductor 94. The heaters 33, 34, 35, 36 and the lamp 45 are all connected to said main return and are also connected to one of the terminals 110 of the switches 100, 101, 102, 103, 104. These switches are of two kinds, being what may be termed a "two selection" switch, shown in Fig. 11, and a "three selection" switch, shown in Fig. 12. Terminal 111 of each of the switches is connected to the conductor 57 and terminal 112 to the conductor 69. In the arrangement shown, the heaters 34, 35 and 36 and the lamp 45 are connected to two selection switches and the heater 33 is connected to the three selection switch 101. Switch 101 has an extra terminal 113 which is connected by a conductor 114 to a thermostatic switch 115 which is located on the outside of the apparatus where it will be subject to the temperature of the room and not subject to the temperature within the apparatus. (See Fig. 3.) Each of the hand switches is provided with a rotatable switch arm 117 pivoted upon a post 118. The parts are so constructed that the switch arm may connect with any one of the terminals of the switch. Consequently the heaters 34, 35 and 36 and the lamp 45 may be connected to either the conductor 57 or conductor 69 as the operator may desire. With the heater 33 the operator has the additional option of connecting the heater 33 to the thermostat 115 and thence through the conductor 116 to conductor 57.

In using the apparatus the operator connects up as many of the heaters with as great wattage as he considers safe to use without danger of overheating conductor 69 directly, and then supplies a sufficient intermittent heat—this intermittent heat being as low as he considers safe to use without danger of too little heat—through the conductor 57 by way of the control contacts 52. In case of anticipated abnormal lowering of room temperature, if the operator will set the switch of the heater 33 so as to throw it in series with the thermostat 115, additional intermittent heat is furnished. The operator will approach an ideal constancy in proportion as he can judge the ratio of the continuous and intermittent heat desirable, providing, of course, that a sufficient variety of switches and heaters of varying wattage be available. Of course if the operator does not deem this ideal constancy of particular importance for a certain use of the bath he may make all of the heat or at least ample heat for his desired temperature intermittent. Many uses of the bath allow this choice to be made. In general, however, especially where a high temperature is carried in the bath, it is very easy to choose a fair proportion between the continuous heat and the intermittent heat and this is desirable from the standpoint of the generator furnishing the electric service as is attested by the method of computing charge for electricity employed by the electrical corporations furnishing service.

The above may be summarized as follows:—

1. Continuous heat is obtained by setting switches to connect heaters directly to source through conductor 69. All the heaters or any one of them may be connected thus.

2. Intermittent heat is obtained by setting switch to connect heaters to conductor 57 and thence through contacts 52 to electric source. Part of the heaters or all of them may be connected thus.

3. Intermittent heat as controlled by room temperature is only obtained by connecting heater 33 to point 113 and thence through room temperature regulator 115 and contact points 52 in series—i. e. controlled through the inner and outer regulator in series.

The rule of conduct to be observed in working the apparatus may be stated thus: The least variation of temperature is obtained by making the continuous heat relatively great and the intermittent heat relatively small but with corresponding danger of overheat or underheat due to a change of room temperature. This danger is avoided by making the intermittent heat relatively large and continuous heat relatively small or by allowing no continuous heat at all, but with correspondingly less constancy of temperature.

The lamp 45 is placed in the bath for illumination purposes and also it may be used for tell tale purposes on the intermittent connectors. If at low temperatures especially it be put on the switch for continuous service, there might be danger of overheat, therefore, at these low temperatures it should be left only on the switch contact for intermittent service. When the bath is in use at high temperatures it is often convenient, and is perfectly safe from dangerous overheat to allow lamp on the continuous connections.

It is obvious that the arms 50, 51 constitute a switch automatically operated by the interior thermostat and that the element 115 is also a thermostatically operated switch.

Having thus described my invention, what I claim as new, and desire to secure by Letters Patent, is:—

1. In apparatus of the class described, the combination of a bath receptacle, an electric heater therefor, an automatic switch subject to the temperature within the bath, and a second automatic switch subject to the temperature outside of the bath, one of said switches being adapted to open the circuit of said heater at one point, and the other adapted to open said circuit at another point, said heater being therefore unenergized unless both of said switches are closed.

2. In apparatus of the class described the combination with a bath receptacle of a heater, means responsive to the temperature outside of said receptacle for controlling said heater and means independent of the first and responsive to the temperature within the bath also for controlling the said heater.

3. In apparatus of the class described the combination of a heater, and two automatic switching devices for controlling the same, one of said switching devices being responsive to the temperature of the room and the other to the temperature of the bath, said switches being capable of operating independently of each other, and adapted to open and close the circuit of said heater at different points therein.

4. In apparatus of the class described the combination of a heater, two automatic switching devices for controlling the same, one of said switching devices being responsive to the temperature of the room and the other to the temperature of the bath, and a second heater, controlled by one and not the other of the aforesaid switching devices.

5. In apparatus of the class described the combination with a bath receptacle of an electric heater, a thermostatic switch responsive to the temperature outside of said receptacle for closing the circuit through said heater, and a second thermostatic switch responsive to the temperature within said receptacle for closing the circuit through the first thermostatic switch, whereby the opening of either of said switches turns off said heater.

6. In apparatus of the class described, the combination of a bath receptacle and two automatically controlled electric heating units therefor, both of said units being responsive to the temperature within the bath and one of them being also responsive to the temperature outside of the bath.

7. In apparatus of the class described the combination with a bath receptacle of an electric heater therefor, a source of electrical current, two thermo responsive switches and a hand operated three-selection switch adapted to throw said heater into circuit with one of said thermo responsive switches, or both of them, or directly into connection with said source of supply.

8. In apparatus of the class described, the combination of a bath receptacle, electric heating means therefor, manually operated means for varying the quantity of heat produced by said heating means, a second heating means, an automatic switch responsive to the temperature within the bath adapted to control both of said heating means, and an additional automatic switch responsive to the temperature outside of the bath adapted to control said second heating means only.

9. In apparatus of the class described, the combination of a bath receptacle, a set of electrical heating resistances, arranged in parallel with each other, an automatic switch responsive to the temperature within the bath adapted to open the circuit of all of said heating resistances, an additional heating resistance, and an automatic switch responsive to the temperature outside of the bath adapted to open the circuit of said additional heating resistance only.

10. In apparatus of the class described, the combination of a bath receptacle, a set of electrical heating resistances arranged in parallel with each other, hand operated switches for each of said resistances, an automatic switch responsive to the temperature within the bath adapted to open the circuit of all of said heating resistances, an additional heating resistance and an automatic switch responsive to the temperature outside of the bath adapted to open the circuit of said additional heating resistance only.

11. In apparatus of the class described, the combination of a bath receptacle, a set of electrical heating resistances arranged in parallel with each other, an additional resistance, an automatic switch responsive to the temperature outside of the bath adapted to open the circuit of said additional heating resistance only, and an automatic switch responsive to the temperature inside of the bath adapted to open the circuits of all of said resistances.

12. In apparatus of the class described, the combination of a bath receptacle, an electric heater therein, a switch located outside of the receptacle for controlling the heater circuit, a perforated, thin, brass tube located within the bath and susceptible to the heat thereof, and a connection between said tube and one of the switch arms for controlling the latter by the expansion and contraction of said tube.

In witness whereof, I have hereunto subscribed my name in the presence of two witnesses.

THOMAS B. FREAS.

Witnesses:
DWIGHT B. CHEEVER,
MARGARET D. ROBB.